United States Patent [19]

Kurokawa et al.

[11] Patent Number: 4,879,678
[45] Date of Patent: Nov. 7, 1989

[54] PROGRAMMABLE SEQUENCE CONTROLLER WITH OPERATION CODES PARTIALLY SUPPLYING JUMP TO ADDRESSES OF MACHINE LANGUAGE INSTRUCTION

[75] Inventors: Naohiro Kurokawa; Ryoichi Abe, both of Shibata, Japan

[73] Assignee: Hitachi, Ltd., Tokyo, Japan

[21] Appl. No.: 702,264

[22] Filed: Feb. 15, 1985

[30] Foreign Application Priority Data

Mar. 26, 1984 [JP] Japan .................. 59-58056

[51] Int. Cl.[4] .............. G06F 9/22; G06F 11/16; G06F 9/30; G06F 9/32
[52] U.S. Cl. .................. 364/900; 364/265.6; 364/261.3; 364/938.0; 364/944.6
[58] Field of Search ... 364/200 MS File, 900 MS File, 364/131, 132, 133

[56] References Cited

U.S. PATENT DOCUMENTS

| | | | |
|---|---|---|---|
| 3,518,413 | 6/1970 | Holtey | 364/200 |
| 4,058,850 | 11/1977 | Sheikh | 364/900 |
| 4,205,370 | 5/1980 | Hirtle | 364/200 |
| 4,231,089 | 10/1980 | Lewine et al. | 364/200 |
| 4,307,445 | 12/1981 | Tredennick et al. | 364/200 |
| 4,336,602 | 6/1982 | Kruger | 364/900 |
| 4,370,729 | 1/1983 | Bosch | 364/900 |
| 4,432,052 | 2/1984 | McDonough et al. | 364/200 |
| 4,439,828 | 3/1984 | Martin | 364/200 |
| 4,484,303 | 11/1984 | Provahzano et al. | 364/900 |
| 4,573,118 | 2/1986 | Damouny et al. | 364/200 |

OTHER PUBLICATIONS

Tanenbaum, Andrew S., Structured Computer Organization, 1976, pp. 150–169.

Primary Examiner—Archie E. Williams, Jr.
Assistant Examiner—Ayni Mohamed
Attorney, Agent, or Firm—Fay, Sharpe, Beall, Fagan, Minnich & McKee

[57] ABSTRACT

Machine language instructions corresponding to sequence instructions that are stored in a first memory are stored at addresses of a second memory corresponding to operating codes of the sequence instructions, and a processing unit executes a sequence control by the instructions fetched from the second memory. A jump instruction with non-designated jump-to address is stored in the second memory. Following fetching of the jump instruction from the second memory, the processing unit fetches the sequence instruction to be next executed from the first memory, and the operation code of that sequence instruction is transferred to the processing unit as a jump-to address of the jump instruction.

6 Claims, 3 Drawing Sheets

FIG. 4
| IN-STRUCTION | OPERATION CODE | |
|---|---|---|
| | BINARY | HEXA-DECIMAL |
| LOAD | 0001 0000 | 10 |
| AND | 0010 0000 | 20 |
| OR | 0011 0000 | 30 |
| OUT | 0100 0000 | 40 |
| UN-DEFINED | 1000 0000 | 80 |
| | 1001 0000 | 90 |
| | ⟨ ⟨ | ⟨ |
| | 1111 0000 | F0 |
| | 0000 0000 | 00 |
FIG. 5
| ADDRESS | | |
|---|---|---|
| ℓ7000 | | JMP |
| 1 | | 70 |
| 2 | | XX |
| ℓ7010 | | LOAD |
| 1 | | 40 |
| 2 | | JMP |
| 3 | | 70 |
| 4 | | 00 |
| ℓ7020 | | AND |
| 1 | | 40 |
| 2 | | JMP |
| 3 | | 70 |
| 4 | | 00 |
| ℓ7030 | | OR |
| 1 | | 40 |
| 2 | | JMP |
| 3 | | 70 |
| 4 | | 00 |
| ℓ7040 | | OUT |
| 1 | | 40 |
| 2 | | JMP |
| 3 | | 70 |
| ℓ7080 | | JMP |
| 1 | | 78 |
| 2 | | 00 |
| ℓ7090 | | JMP |
| 1 | | 78 |
| 2 | | 00 |
| ℓ70A0 | | JMP |
| 1 | | 78 |
| 2 | | 00 |
| ℓ7800 | | ERROR PROCESSING |
FIG. 6
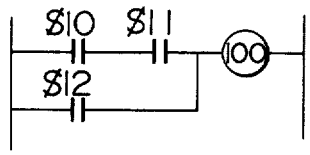
FIG. 7
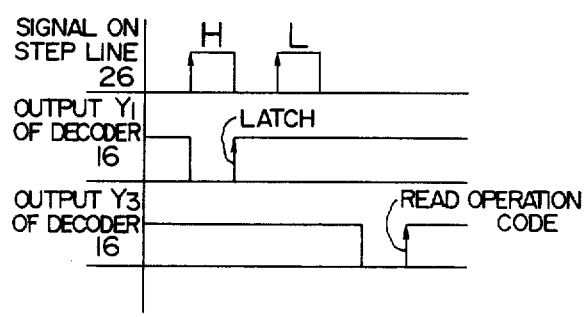

PROGRAMMABLE SEQUENCE CONTROLLER WITH OPERATION CODES PARTIALLY SUPPLYING JUMP TO ADDRESSES OF MACHINE LANGUAGE INSTRUCTION

TECHNICAL FIELD

The present invention relates to a programmable controller and more particularly to a programmable sequence controller.

BACKGROUND ART

The programmable controller is a unit which processes input information by a processing unit (CPU) in accordance with a sequence program stored in a memory (RAM) by a user and selectively operates equipment connected to output terminals in accordance with the operation result to attain a programmed sequence control. The programming may be constructed by a sequencer language which is easy to use for the user, such as LOAD, AND and OR.

A processing system for executing the sequencer language program by the processing unit (CPU) includes an interpreter system in which a quasi-coded program is executed while it is sequentially decoded, and a compiler system in which the program is translated to a machine language so that it is instantly executed. The prior art programmable controller used one of those systems.

The former system, however, has drawbacks of a long time being required for decoding instructions and low processing speed, and in the latter system the processing unit (CPU) may be allowed to overrun if the translated program is destroyed by an external disturbance such as noise because there is no means for checking overrun.

Since those problems directly relate to the performance and safety of the programmable controller, solutions thereof have been desired.

STATEMENT OF THE INVENTION

It is an object of the present invention to provide a programmable controller having a high processing speed.

It is another object of the present invention to provide a sequence controller in which overrun of a processing unit is minimized.

In accordance with the present invention, there are provided a first memory unit for storing therein a sequence program including a combination of sequence instructions, a second memory unit for storing therein machine language instructions corresponding to the sequence instructions at jump to addresses partially designated by operation codes of the sequence instructions and a jump instruction with non-designated jump-to address, a processing unit for executing sequence control in accordance with the instructions read from the second memory unit, and instruction transfer unit for decoding a predetermined address signal supplied from the processing unit to read out a jump-to address following readout of the jump instruction and for fetching the sequence instruction to be executed next from the first memory unit and transferring the operation code of that sequence instruction to the processing unit as part of the jump-to address.

BRIEF DESCRIPTION OF THE DRAWINGS

FIG. 4 is a table of an instruction word and an operation code;

FIG. 5 is an example of a system program stored in a system ROM of FIG. 2,

FIG. 6 is a sequence chart for illustrating an operation; and

FIG. 7 is a timing chart therefor.

DETAILED DESCRIPTION OF THE INVENTION

Figure 1:
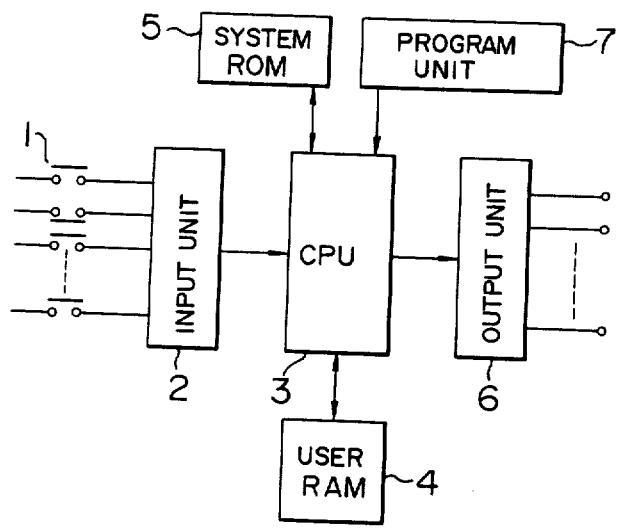
FIG. 1 is a block diagram of a basic configuration of a programmable controller.

A basic configuration of the programmable controller is shown in FIG. 1. Numeral 1 denotes contacts which are input signal sources, numeral 2 denotes an input unit which receives input signals from the contacts 1, numeral 3 denotes a processing unit (CPU) for executing a sequence control, numeral 4 denotes a readable and writable memory (user RAM) which is a first memory unit for storing therein a sequence program prepared by a user, numeral 5 denotes a read-only memory (system ROM, a non-volatile memory) which is a second memory unit for storing therein a control procedure (system program) for executing the sequence program, numeral 6 denotes an output unit for transferring the operation result of the CPU 3 to external equipment not shown, and numeral 7 denotes a program unit for writing the sequence program keyed in by the user into the user RAM 4.

Figure 2:
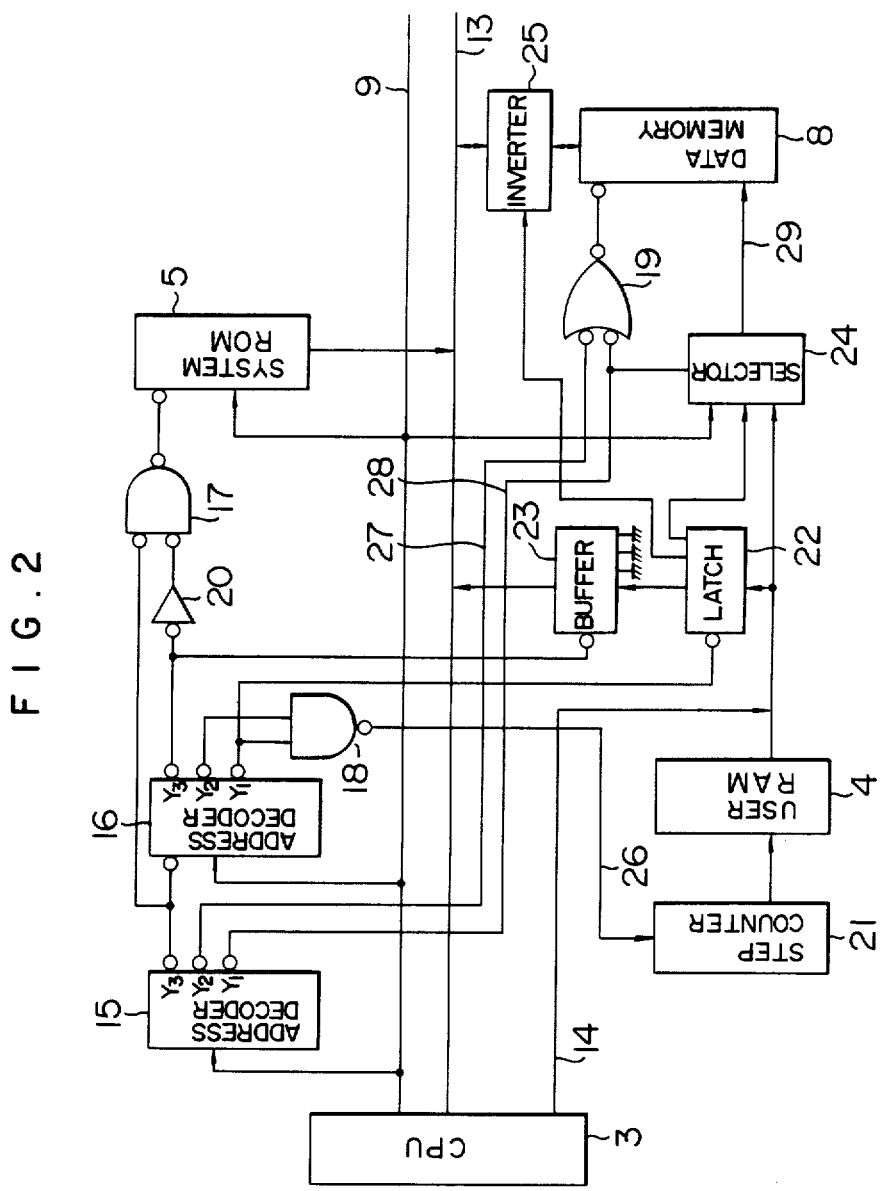
FIG. 2 is a circuit diagram of one embodiment of the present invention.

FIG. 2 shows a circuit diagram of one embodiment of the present invention, which comprises the CPU 3, the user RAM 4, the system ROM busses 8, 13, 14 and a peripheral circuit The peripheral circuit is for transferring the operation code and data among the CPU3, USER RAM 4 and SYSTEM ROM 5. Numeral 8 denotes a data memory which is a readable and writable memory (RAM) for temporarily storing therein signals supplied by the input unit 2 of FIG. 1, signals to be supplied to the output unit 6 and the operation result of the CPU 3. Numeral 9 denotes an address bus, numeral 13 denotes a first data bus which serves as a main transfer line of instructions and data, and numeral 14 denotes a second data bus which is used to write the sequence program into the user RAM 4.

The peripheral circuit for transferring the operation code and data includes the elements of FIG. 2, except for elements 3, 4, 5 and busses 9, 13 and 14, and it is described below.

Numerals 15 and 16 denote address decoders. When an address signal from the CPU 3 is applied thereto, only the selected one of $Y_1$, $Y_2$ and $Y_3$ assumes "0" and non-selected ones assume "1". Numeral 17 denotes an OR gate, numeral 18 denotes a NAND gate, numeral 19 denotes an AND gate, and numeral 20 denotes an inverter. Those elements logically operate in accordance with the outputs of the address decoders 15 and 16. Numeral 21 denotes a step counter for selecting the contents of the user RAM 4, numeral 22 denotes a latch for latching the signal from the user RAM 4 at a predetermined timing, and numeral 23 denotes a buffer which receives the output of the latch 22 and transfers it to the CPU 3 through the data bus 13 at a predetermined timing. The buffer 23 has three output states "0", "1" and "High Impedance". Except when the signal from the user RAM 4 is transferred, the output state is "High Impedance" so that other data transfer on the first data bus 13 is not impeded. Numeral 24 denotes a selector which selects the signal from the user RAM 4 and latch 22 or the signal from the address bus 9 and supplies the selected signal to the data memory 8 over line 29. Inverter 25 inverts or non-inverts the output of the data memory 8 and supplies it to the first data bus 13.

Figure 3:
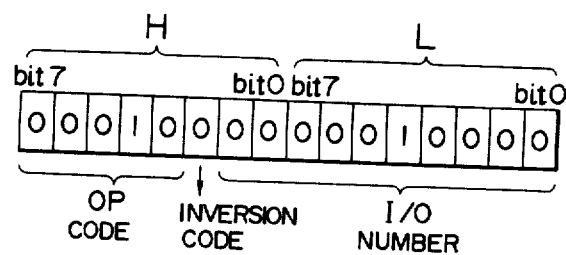
FIG. 3 shows an example of a sequence program stored in a user RAM of FIG. 2.

FIG. 3 shows an example of the sequence program stored in the user RAM 4. One sequence instruction comprises 16 bits of which 5 bits are used for an operation code, 1 bit is used for an inversion code and 10 bits are used for an I/O number. Since the user RAM 4 uses a general-purpose 8-bit memory, each sequence instruction is divided into an 8-bit H byte and an 8-bit L byte, which are sequentially stored in this order. The sequence program comprises a plurality of such sequence instructions. The operation code may be expressed in any manner. For example, it has one-to-one correspondence to the sequencer lanquage instructions (LOAD, AND, OR, OUT, etc.) as shown in FIG. 4.

In FIG. 3, low order three bits of the operation code are omitted. "00010" shown therein corresponds to "00010000" in the 8-bit code (or $10 in a hexadicimal expression).

Undefined operation codes in FIG. 4 are provided for use in error checking, which will be explained later.

FIG. 5 shows a portion of the system program stored in the system ROM 5. Machine language instructions corresponding to the sequence instructions of RAM 4 are stored at addresses in ROM 5 partially shown by JMP, LOAD, AND, OR and OUT. A jump-to address of the JMP (jump) instruction at address $7000 consists of two words, "70" and "XX" respectively at addresses $7001 and $7002. "XX" means that it is any code and the jump-to address is not designated. The "XX" portion of the non-designated jump-to address is determined by the operation code of the sequence instruction stored in the user RAM 4. The machine language instructions corresponding to the sequence instructions such as LOAD, AND, OR, OUT are stored at addresses partially designated by the operation codes of the sequence instructions. For example, jump-to addresses of the JMP instruction ($7000) are designated partially by the operation codes. The JMP instructions at the addresses 7012, 7022, 7032 and 7042 are used to return the program to the address $7000 when the processing is executed in accordance with the sequence instructions. The addresses $7080 et seq contain an error check and error processing program which is used when the content of the user RAM 4 is destroyed. This will be explained later.

The operation of the present invention is explained for a ladder sequence shown in FIG. 6. This ladder sequence includes three contacts (I/O number $10-$12), one output (I/O number 100) and wires.

When the CPU 3 supplies an address signal (for example, $7000) read from ROM 5 to the address bus 9, the output $Y_3$ of the address decoder 15 is selected and the output "0" thereof is supplied to the OR gate 17 and the address decoder 16 so that the decoder 16 is enabled.

The output $Y_1$ of the address decoder 16 is selected and the output "0" thereof is produced. Since the non-selected output $Y_3$ of the decoder 16 is "1", the output of the inverter 20 is "0" and the OR gate 17 produces the "0" output. The system ROM 5 is selected by the output of the OR gate 17 and the content at the address $7000 shown in FIG. 5 is read out onto data bus 13. Since the output $Y_1$ of the address decoder 16 is "0" and the output $Y_2$ of the address decoder 16 is "1", the NAND gate 18 produces "1" as an output to the stepping line 26 of the step counter 21. Thus, the step counter 21 is incremented by one and the signal thereof is transferred to the user RAM 4. Thus, the user RAM 4 is selected stepwise and the H-byte of the sequence instruction shown in FIG. 3 (the operation code, the inversion code and a portion of the I/O number) is read out. Outputs $Y_1$ and $Y_2$ of address decoder 15 are sent through select lines 28, 27, respectively.

Since the content at the address $7000 is the JMP instruction, the CPU 3 supplies the address $7001 to the address bus 9 to read out the next data content of the system ROM 5, that is, the content of $7001. The latch 22 is enabled by the trailing edge of the output $Y_1$ of the address decoder 16 to latch the H-byte of the sequence instruction read from the user RAM 4. The timing therefor is shown in FIG. 7.

As the address signal at $7001 is generated, the output $Y_3$ of the address decoder 15 is selected and the output $Y_2$ of the address decoder 16 is selected. Accordingly, the output of the OR gate 17 is "0" and the system ROM 5 remains selected. Since the output $Y_1$ of the address decoder 16 is "1" and the output $Y_2$ is "0", the NAND gate 18 again produces the "1" output on the stepping line 26 so that the step counter 21 is incremented by one. Accordingly, the L-byte of the sequence instruction shown in FIG. 3 (remaining portion of the I/O number) is read out.

Then, the CPU 3 supplies the address $7002 to the address bus 9 to read out the content at the address $7002. The $Y_3$ output of the address decoder 15 is selected and the output $Y_3$ of the address decoder 16 is selected and the "0" output thereof is inverted by the inverter 20. Thus, the output of the OR gate 17 is "1" so that the system ROM 5 is non-selected, and the buffer 23 is selected by the output $Y_3$ of the address decoder 16. The buffer 23 receives the content latched in the latch 22, that is, five bits of the operation code in the H-byte of the sequence instruction stored in the user RAM 4 and constructs an 8-bit code by adding "0" to three low order bits, and supplies the 8-bit code to the data bus 13. Accordingly, the CPU 3 fetches the 8-bit instruction code through the buffer 23 instead of the content at the address $7002 of the system ROM 5. The timing therefor is shown in FIG. 7.

The CPU has thus fetched "70" and "XX=10" from ROM 5 and RAM 4 respectively using the addresses $7001 and $7002 of the system ROM 5. It then supplies the address signal $7010 to the address bus 9. Thus, the output $Y_3$ of the address decoder 15 is "0" and the output $Y_3$ of the address decoder 16 is "1" and the system ROM 5 is selected again. Accordingly, the processing by the CPU 3 is jumped to the jump-to address $7010.

Since the address $7010 contains the LOAD instruction instructing to "read address $40", the CPU 3 supplies the signal $40 to the address bus 9. Thus, the output $Y_2$ of the address decoder 15 assumes "0" and the output "0" is supplied to the AND gate 19 through the select line 27 and the data memory 8 is selected by the output "0" of the AND gate 19. The address decoder 15 is set to output $Y_2$ as "0" based on the signal $40. Since the I/O number in the L-byte of the sequence instruction fetched from the user RAM 4 and the I/O number in the H-byte of the sequence instruction latched in the latch 22 are supplied to the address line 29 of the data memory 8 through the selector 24, the contents of the data memory corresponding to the above I/O numbers are supplied to the data bus 13 through the inverter 25 and supplied to the CPU 3. The current sequence (op code is $10 shown in FIG. 3) is "Read input signal from the contact" (I/O number $10) which has previously been stored in the data memory 8, is fetched by the CPU 3.

The inverter 25 inverts or non-inverts the signal from the data memory 8 depending on whether the inversion code bit of the sequence instruction latched in the latch 22 is "1" or "0". It is used to invert the input signal from the normally closed contact.

CPU 3 then reads out the content at the address $7012 and executes it. Since the address $7012 contains "JMP 7000", that is, "jump to the address $7000", the processing of the CPU 3 again jumps to the address $7000.

The execution of the sequence instruction shown in FIG. 3 is thus terminated and the next sequence instruction (logical AND of the input signal at the contact 11) is started. In the following execution of the instruction, the machine language instruction corresponding to the sequence instruction is selected by the JMP instruction at the address $7000. Only the jump-to-address "XX" is different. The jump-to address is determined by the operation code stored in the user RAM 4 and the CPU 3 executes the machine language instruction at the designated jump-to address.

Since the operation code of the sequence instruction stored in the user RAM 4 is read by the CPU 3 as the jump-to address and machine language instruction stored in the system ROM 5 is addressed in accordance with the sequence instruction, the instruction decode routine which was necessary in the prior art interpreter system can be omitted and the fetched instruction can be instantly executed. Accordingly, the processing speed is significantly improved. For example, the processing speed was 40 ms/kw in the interpreter system while it is 20 ms/kw or less in the present system.

Since the instructions for the operand codes are stored in the system ROM 5 as the machine language isntructions, these instructions are not destroyed by an external disturbance such as a noise and the safety is guaranteed. In the present system, since an error processing routine may be stored in the system ROM 5 as a part of the system program, the safety is assumed even if the content of the user RAM 4 is destroyed by the external disturbance such as noise. For example, in case the content of the user RAM 4 is destroyed, several undefined operation codes (80, 90 — F0,00) are provided as shown in FIG. 4 and "JMP 7800" is stored at each of the addresses corresponding to the undefined operand codes as shown in FIG. 5. Assuming that the address $7800 contains the error processing routine, the overrun of the CPU 3 is avoided and an alarm may be issued even if the content of the user RAM 4 is destroyed, because the jump to the error processing routine is obtained from the jump-to address partially corresponding to the undefined operation code.

The function of the selector 24 is not explained. The signals from the user RAM 4 and the latch 22 are supplied to the address line 29 through the selector 24. When the CPU 3 generates a specific address signal, the output $Y_1$ of the address decoder 15 is selected and the output signal thereof is supplied to the selector 24 through the select line 28. Thus, the selector 24 selects such that the signal on the address bus 9 is supplied to the address line 29. Thus, the CPU 3 is allowed to directly access the data memory 8 as required. Through this function, the CPU 3 can read in the signals of the contacts 1 in FIG. 1 and store them in the data memory 8 and transfer the specified content of the data memory 8 to the output unit 6 by the direction access between the CPU 3 and the date memory 8 without intervention of the user RAM 4. Accordingly, high speed data processing is attained.

In the above embodiment, the signals of the contacts 1 are collectively read at each scan time and stored in the data memory 8, and the specified content of the data memory 8 is read out by the signal from the user RAM 4. Alternatively, the I/O number read from the user RAM 4 may be latched and it is supplied to the CPU 3 through the buffer at a predetermined timing in the same manner as that of the reading of the specified content of the data memory 8 by the signal from the user RAM 4 so that the input signal from the specific contact is read in without routing the memory each time the instruction is executed. The same is true for the data output to the output unit 6.

In accordance with the present invention, the machine language instruction corresponding to the sequence instruction is selected using the operation code of the sequence instruction as a part of the jump-to address. Accordingly, it is not necesary to interprete the operation code each time it is fetched as is done in the prior art interpreter system and the processing speed is increased. Since the machine language instructions and the error processing routine are stored in the memory such as system ROM the content of which will not be destroyed by the external disturbance, the overrun of the CPU which occurred in the prior art compiler system is prevented and the safety is enhanced.

We claim:
1. A programmable sequence controller, comprising:
first read/write memory means for storing therein a sequence program provided by the user and including a combination of sequence instructions having different operation codes corresponding to different functions;
second memory means storing therein a plurality of different machine language instructions, corresponding to said different functions of said sequence instructions, at addresses that are an arithmetic combination of a single number and said operation codes of said sequence instructions respectively;
said second memory means storing therein, at a head address, a head jump instruction with a non-designated jump-to address;
said second memory means storing therein a jump to said head address as a terminal part of each of said machine language instructions;
processing means for processing said sequence program on the basis of said machine language instructions fetched from said second memory means to produce operation results; and
instruction transfer means for reading out the sequence instruction to be executed from said first memory means and transferring the operation code of the sequence instruction to be executed to said processing means as part of the jump-to address of said head jump instruction;
said processing means executing said head jump instruction with the jump-to address that is the arith- metic combination of said single number and said operation code of the sequence instruction to be executed to jump to and execute the machine language instruction corresponding to the sequence instruction to be executed;

input means for transferring input signals from outside the controller into said processing means;

output means for transferring an operation result of said processing means to external equipment; and address bus means and data bus means interconnecting said first and second memory means, said processing means, said instruction transfer means, said input means, and said output means.

2. A programmable controller according to claim 1 wherein said second memory means is a non-volatile memory.

3. A programmable controller according to claim 1 wherein said first memory means is a random access memory and said second memory means is a read-only memory.

4. A programmable controller according to claim 1 wherein said second memory means storing therein machine language instructions of a jump to an error processing routine at addresses only partially defined by undefined operation codes of said first memory means.

5. A programmable controller according to claim 1, having said second memory means head jump instruction including the high portion of the range of addresses that include all of the addresses of said machine language instructions so that said head jump instruction forces a jump to said range for all possible operation codes of the sequence instructions in said first memory means, said machine language instructions for each function including terminal instructions for jumping to said head jump instruction; said second memory means storing therein machine language instructions for an error processing routine at a subroutine address outside of said range and further storing a plurality of machine language error jump instructions to jump to the beginning of said subroutine address with said error jump instructions being located at all of the addresses of said range following said machine language instructions.

6. The programmable sequence controller according to claim 1, wherein said head jump instruction includes a base address and said operation codes are offset addresses; and said processing means executing said head jump instruction with the jump to address consisting of an arithmetic combination of only said base address and said offset address.

* * * * *